Oct. 9, 1923.  
W. A. CONTANT  
GRADING MACHINE  
Filed Dec. 11, 1922

INVENTOR.  
*William A. Contant.*  
BY  
*Davis & Jimino*  
*his* ATTORNEYS.

Oct. 9, 1923.

W. A. CONTANT

GRADING MACHINE

Filed Dec. 11, 1922

INVENTOR.
William A. Contant.
BY Davis & Simins
his ATTORNEYS.

Patented Oct. 9, 1923.

1,470,060

UNITED STATES PATENT OFFICE.

WILLIAM A. CONTANT, OF ROCHESTER, NEW YORK, ASSIGNOR TO F. B. PEASE COMPANY, OF ROCHESTER, NEW YORK, A CORPORATION OF NEW YORK.

GRADING MACHINE.

Application filed December 11, 1922. Serial No. 606,052.

*To all whom it may concern:*

Be it known that I, WILLIAM A. CONTANT, a citizen of the United States, and resident of Rochester, in the county of Monroe and State of New York, have invented certain new and useful Improvements in Grading Machines, of which the following is a specification.

The present invention relates to grading machines for fruit, vegetables or the like and more particularly to the type in which there is employed an endless carrier which has movable members thereon for varying the sizes of the grading openings in the carrier. An object of this invention is to provide an endless carrier substantially in the form of a belt and having an inclined receiving portion and a substantially horizontally arranged grading portion, there being provided between these two portions a pulley or wheel over which the endless belt passes and provision being made whereby the movable members will be held against movement relatively to the fixed portion of the belt during the passage over this pulley or wheel. Another object of the invention is to control the movable members through an endless trackway preferably embodying a plurality of independently adjustable sections, each having a resilient portion connecting with an adjacent section, so that a continuous trackway is provided by the sections of the trackway, notwithstanding the relative adjustment of the sections.

To these and other ends, the invention consists of certain parts and combinations of parts, all of which will be hereinafter described: the novel features being pointed out in the appended claims.

In the drawings:

Fig. 1 is a side view of a grader constructed in accordance with this invention;

Figure 2:
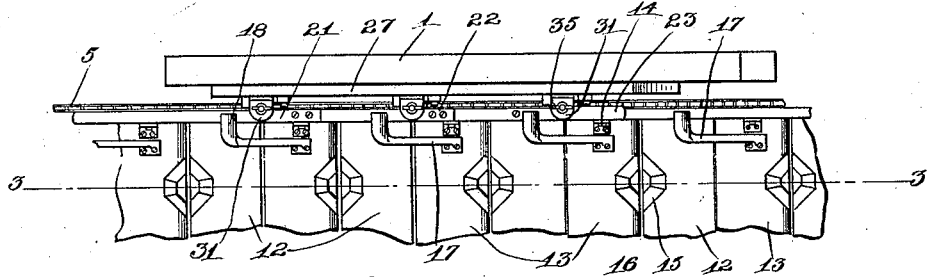
Fig. 2 is a fragmentary top view of one side of the machine.
Figure 3:
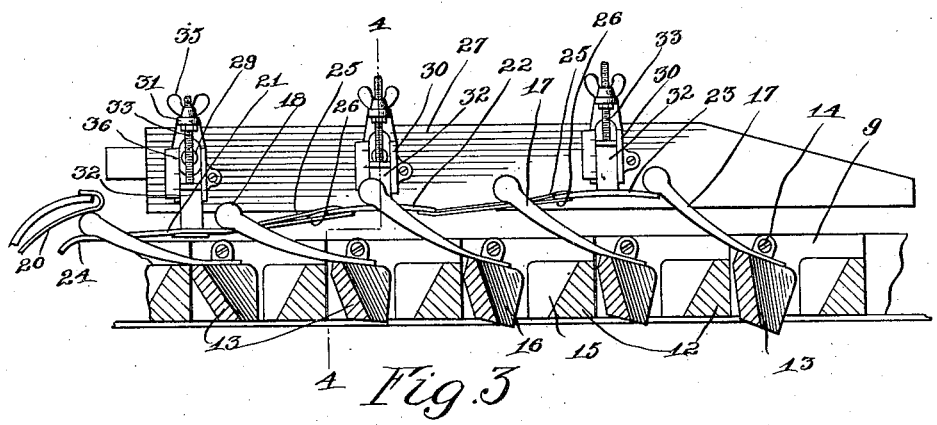
Fig. 3 is a section on the line 3—3, Fig. 2.
Figure 4:
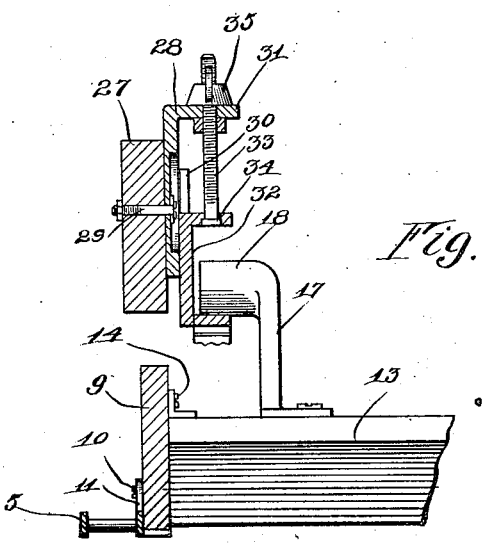
Fig. 4 is an enlarged section on the line 4—4, Fig. 3.

Referring more particularly to the drawings, 1 indicates the frame of the machine provided with a plurality of different receiving compartments 2, 3 and 4 in which the different grades of apples or other articles are dropped. Over these receiving receptacles an endless carrier travels and drops the articles in the receptacles according to their sizes. This endless carrier in this embodiment comprises two endless chains 5 passing over sprocket wheels 6, three pairs, in this instance, being provided mounted on three shafts 7, the two sprocket chains passing over the two pairs of sprocket wheels 6 on each shaft 7. Preferably the shafts 7 are arranged to provide an inclined or receiving portion on the endless carrier to which the articles to be separated are delivered by a chute 8. From this inclined receiving portion the endless carrier passes to a substantially horizontally arranged grading portion where the articles of fruit are graded.

In addition to the endless sprocket chains 5 the endless carrier embodies heads 9 connected by screws 10 with certain links of the sprocket chains through lips 11 formed on the sprocket chains. These heads 9 are connected in pairs to one member on each sprocket chain by a cross bar or transversely extending piece 12 which is rigidly secured to the two heads 9. The cross pieces 12 are arranged in spaced relation and in the spaces between these cross pieces movable cross pieces or transversely extending pieces 13 are provided, these movable cross pieces 13 being preferably pivoted at opposite ends at 14 to the heads 9 preferably on the outer side of said cross piece 12 to turn about axes extending transversely of the carrier. The opposed faces of each two proximate cross pieces 12 and 13 are provided with recesses 15 and 16 respectively in the cross pieces 12 and 13. When a movable cross piece 13 is in its nearest position to a fixed cross piece 12, then the grading opening provided by the two recesses 15 and 16 is the smallest, and as the movable cross piece 13 moves away from the fixed cross piece 12 this opening increases in size.

In order to control the movement of the movable cross pieces or members 13 each movable cross piece has an arm 17 at one end with a laterally extending portion 18 adapted to travel along suitable guides or tracks in order to control the position of the movable cross pieces or members 13. A track that the laterally projecting portion 18 of the arm 17 engages is indicated at 19 and lies over the receiving and elevating portion of the conveyor, cooperating with the uppermost side of the projection 18 and holding the member 13 in a position nearest to the fixed member 12. In order to permit the carrier to move about the sprocket at the upper part of the receiving portion without, at the same time, moving the movable cross pieces 13 with reference to the fixed cross pieces 12, a yielding track 20 is provided which will cooperate with the projections 18 after the latter pass over the track 19 and hold the members 13 toward their members 12 while, at the same time, permitting the carrier to move about the sprocket wheels at the upper ends of the portions of the receiving carrier.

After passing from the yielding trackway 20 the projections 18 cooperate with an adjustable trackway arranged above the grading portion of the carrier. This adjustable trackway, in this instance, is formed of a plurality of adjustable sections indicated, in this instance, at 21, 22 and 23. The section 21 has a curved portion 24 which engages under the lateral projection 18 of each controlling arm 17 before the latter passes from the yielding trackway 20. The adjustable section 21 also has a resilient portion formed of two layers 25 and 26 which are spaced apart at their free ends to engage opposite faces of one end of the section 22. The section 22 also has these two space layers on straps 25 and 26 which lie respectively above and below one end of the section 23. These resilient connections between the sections permit the relative adjustment of the sections while, at the same time, providing a continuous trackway between the sections. The adjustment and support of the sectional trackway may be obtained by the provision of a side board 27 arranged above the path of travel of the end pieces 9 at one side of the endless carrier and having mounted thereon a bracket 28 through a bolt 29. This bracket 28 has guides 30 thereon and also has a laterally projecting portion 31 at its upper end. On the guides 30 a slide 32 is movable through a screw 33 which turns at 34 in the slide and has its upper end extending through an opening in the laterally extending portion 31 and provided with a thumb nut 35. The turning of this thumb nut raises and lowers the slide 32 which is connected with one of the track sections 21, 22 or 23. Graduations 36 may be provided on the bracket 28 to cooperate with the laterally extending portion 31 so as to define the positions of the slides 32.

After the arms 17 pass off the adjustable and sectional trackway, they travel around the sprocket wheel 6 at the rear end of the machine and after they pass under said sprocket wheels, the laterally extending portions 18 engage with a trackway 37 which acts to hold the cross pieces 13 against vibration during the movement of the carrier toward the receiving end of the machine.

From the foregoing it will be seen that there has been provided a grader in the form of an endless carrier having movable members therein cooperating with fixed portions of the carrier to provide grading spaces, these movable members being controlled by a trackway which is adjustable so that the amount of movement between the movable members and the fixed portions of the carrier may be varied. This trackway is sectional and adjacent sections are connected by resilient portions one on one section cooperating with an adjacent portion on the other section. Provision is made for holding the movable members against movement relatively to the fixed portion of the carrier as the carrier passes about wheels between the receiving portion and the grading portion. This means holds the movable members with yielding pressure toward the fixed portions.

Each resilient connection connects with an adjacent section in such a manner that an enlargement or projection is provided in the trackway. This enlargement cooperates with the arms of the movable members in such a manner as to produce an agitating or shaking action in the movable member as the arm passes over the enlargement. In this way any of the articles which might become stuck or jammed in the opening will be dislodged.

What I claim as my invention and desire to secure by Letters Patent is:

1. In a grader, the combination with an endless carrier formed with rigid transversely extending members and movable transversely extending members providing with said rigid transversely extending members grading spaces, and arms secured to said movable members to control the movement of said movable members relatively to the rigid members, of wheels about which said endless carrier is guided to provide an inclined receiving portion and a grading portion on a trackway for controlling the movement of the arms while the movable members are passing the grading portion, a trackway for holding said arms against movement while the movable members are passing the receiving portion, and a yielding trackway portion adjacent the junction of the receiving and grading portion for cooperating with the arms as the movable members move from the receiving portion onto the grading portion to hold the movable members against movement relatively to the rigid members.

2. In a grader, the combination with an endless carrier embodying a plurality of rigid members and a plurality of movable members, providing with said rigid members grading spaces and movable to vary the size of said spaces, of a continuous trackway having adjustable portions for controlling the movement of the movable members to vary the size of said spaces, said resilient connections embodying two layers extending from one portion, spaced apart at their free ends and engaging opposite faces of one end of a proximate portion.

WILLIAM A. CONTANT.